(12) United States Patent
Chen et al.

(10) Patent No.: US 12,463,901 B2
(45) Date of Patent: Nov. 4, 2025

(54) METHOD AND APPARATUS FOR PROCESSING FORWARDING ENTRY

(71) Applicant: HUAWEI TECHNOLOGIES CO., LTD., Guangdong (CN)

(72) Inventors: Haiyan Chen, Wuhan (CN); Wanhong Meng, Shenzhen (CN); Yan Xu, Nanjing (CN); Kai Du, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 180 days.

(21) Appl. No.: 18/316,383

(22) Filed: May 12, 2023

(65) Prior Publication Data

US 2023/0336457 A1 Oct. 19, 2023

Related U.S. Application Data

(63) Continuation of application No. PCT/CN2021/128779, filed on Nov. 4, 2021.

(30) Foreign Application Priority Data

Nov. 13, 2020 (CN) .......................... 202011271278.4

(51) Int. Cl.
*H04L 45/74* (2022.01)
*G06F 13/16* (2006.01)
*H04L 9/40* (2022.01)

(52) U.S. Cl.
CPC .............. *H04L 45/74* (2013.01); *G06F 13/16* (2013.01); *H04L 63/0876* (2013.01)

(58) Field of Classification Search
CPC ..... H04L 45/02; H04L 45/74; H04L 63/0876; H04L 45/54; G06F 13/4265; G06F 13/16;
(Continued)

(56) References Cited

U.S. PATENT DOCUMENTS 12,026,116 B2 * 7/2024 Kutch ................. G06F 12/0802
2003/0112811 A1 6/2003 Hadi Salim
(Continued)

FOREIGN PATENT DOCUMENTS

CN 102255804 A 11/2011
CN 105656786 A 6/2016
(Continued)

OTHER PUBLICATIONS

IP Routing Explained, NetworkLessons.com, Apr. 1, 2019 evidenced by the Wayback machine Retrieved from <https://networklessons.com/cisco/ccna-routing-switching-icnd1-100-105/ip-routing-explained> p. 1-5 (Year: 2019).*
(Continued)

*Primary Examiner* — Tonia L Dollinger
*Assistant Examiner* — Joseph M Cousins (57) ABSTRACT

A method and an apparatus for processing a forwarding entry are disclosed. The method for processing a forwarding entry includes: receiving an entry operation packet through a first data channel; parsing the entry operation packet to obtain forwarding entry operation information; and performing a target operation on a memory based on the forwarding entry operation information, where the target operation includes adding an entry, deleting an entry, or modifying an entry.

19 Claims, 7 Drawing Sheets

(58) Field of Classification Search
CPC . G06F 13/4282; G06F 13/1605; G06F 13/404
See application file for complete search history.

(56) References Cited

U.S. PATENT DOCUMENTS

| | | |
|---|---|---|
| 2015/0312142 A1 | 10/2015 | Barabash et al. |
| 2016/0285735 A1 | 9/2016 | Chen et al. |
| 2016/0301571 A1 | 10/2016 | Wang et al. |
| 2017/0070416 A1* | 3/2017 | Narayanan .............. H04L 45/42 |

FOREIGN PATENT DOCUMENTS

| | | | |
|---|---|---|---|
| CN | 107005469 A | 8/2017 | |
| CN | 108874987 A | 11/2018 | |
| CN | 109525495 A | 3/2019 | |
| CN | 110445721 A | 11/2019 | |
| CN | 111224964 A | 6/2020 | |
| WO | WO-2021237804 A1 * | 12/2021 | ............... G01B 7/16 |

OTHER PUBLICATIONS

WO-2021237804-A1 (translation), Clarivate Analytics, Jun. 9, 2020 p. 1-15 (Year: 2020).*
Extended European Search Report issued in EP21891037.0, dated Mar. 1, 2024, 7 pages.
International Search Report and Written Opinion issued in PCT/CN2021/128779, dated Dec. 22, 2021, 11 pages.

* cited by examiner

METHOD AND APPARATUS FOR PROCESSING FORWARDING ENTRY

CROSS-REFERENCE TO RELATED APPLICATIONS

This application is a continuation of International Application No. PCT/CN2021/128779, filed on Nov. 4, 2021, which claims priority to Chinese Patent Application No. 202011271278.4, filed on Nov. 13, 2020. The disclosures of the aforementioned applications are hereby incorporated by reference in their entireties.

TECHNICAL FIELD

The present disclosure relates to communications technologies, and in particular, to a method and an apparatus for processing a forwarding entry.

BACKGROUND

In scenarios such as a traffic ingress and internal distribution of a data center, a large quantity of hardware forwarding devices are used, for example, a conventional switch, a white-box switch, a programmable switch, and a network forwarding device. All these forwarding devices need to implement data forwarding on a forwarding plane based on a forwarding entry. The forwarding entry is usually generated and delivered by a control plane, and a central processing unit (CPU) on the forwarding device needs to participate in calculation and configuration delivery, to store the forwarding entry in a memory of the forwarding plane through a peripheral component interconnect express (PCI-E) bus. Then, the forwarding plane reads the forwarding entry in the memory to forward a packet.

With cloudification of increasingly more services and enterprises, a scale of a cloud data center is becoming larger, and a traffic volume is increasing. In this case, a speed of storing the forwarding entry in the memory is more sensitive. Especially in an early stage of service recovery, massive forwarding entries need to be created and stored in the memory instantaneously to enable services. In one aspect, the CPU is heavily burdened, and performance of the CPU also affects efficiency of processing the forwarding entry. In another aspect, a processing capability of the PCI-E bus also affects efficiency of processing the forwarding entry.

SUMMARY

The present disclosure provides a method and an apparatus for processing a forwarding entry. An entry operation packet carrying forwarding entry operation information is received through a data channel, and a CPU does not need to generate and deliver the forwarding entry operation information. This not only reduces load of the CPU, but also prevents performance of the CPU from affecting processing of a forwarding entry. Because the CPU does not need to participate in generation and delivery of a forwarding entry, the forwarding entry is no longer processed through a bus (for example, a PCI-E bus) between the CPU and memory but through a high-speed bus between a forwarding chip and the memory, which greatly improves efficiency of processing the forwarding entry.

According to a first aspect, the present disclosure provides a method for processing a forwarding entry, including: receiving an entry operation packet through a first data channel, where the first data channel is all data channels or any of a plurality of preset data channels; parsing the entry operation packet to obtain forwarding entry operation information; and performing a target operation on a memory based on the forwarding entry operation information, where the target operation includes adding an entry, deleting an entry, or modifying an entry.

The first data channel is all data channels or any one or more of a plurality of preset data channels. Data channels in a forwarding device are formed between a forwarding chip and a plurality of forwarding ports through a high-speed bus. Therefore, the first data channel may be any of all the data channels, and the forwarding chip may process a packet received on any of all the data channels. Alternatively, the first data channel may be some of all the data channels (the some data channels may be specified in advance, and in addition to receiving and sending a data packet, the some data channels may further receive and send an entry operation packet in the present disclosure). The forwarding chip may process a packet received on any of the plurality of preset data channels.

A forwarding port that is on the forwarding device and that corresponds to the first data channel receives a to-be-processed packet, and then transmits the packet to the forwarding chip through the first data channel. The forwarding chip performs processing in the following steps on the packet. In other words, any forwarding port on the forwarding device can receive a packet, and then each forwarding port transmits the packet to the forwarding chip through a corresponding data channel. In the present disclosure, the forwarding chip may perform processing in the following steps on packets from all the data channels or the preset data channels. It should be noted that a source of the packet is not specifically limited in the present disclosure. For example, the packet may be generated by a higher layer of the forwarding device, or may be generated by a third-party device. The packet may be a general data packet, or may be an entry operation packet carrying forwarding entry operation information. Therefore, the forwarding chip first determines whether the received packet is an entry operation packet. If the received packet is not an entry operation packet, the forwarding chip forwards the packet as a general data packet; or if the received packet is an entry operation packet, the forwarding chip performs processing in the following steps. Optionally, the forwarding chip may parse a preset field in the packet, and then determine, based on a value of the field, whether the packet is an entry operation packet.

The forwarding entry operation information includes an operation code, and the operation code indicates to perform the target operation on the memory. The target operation includes adding an entry, deleting an entry, or modifying an entry. When a value of the operation code corresponds to the adding an entry, a forwarding entry is added to the memory. To be specific, the forwarding chip generates a new forwarding entry based on the forwarding entry operation information, and writes the forwarding entry into the memory. When a value of the operation code corresponds to the deleting an entry, a forwarding entry is deleted from the memory. To be specific, the forwarding chip finds a corresponding forwarding entry from the memory based on the forwarding entry operation information, and deletes the forwarding entry. When a value of the operation code corresponds to the modifying an entry, a forwarding entry in the memory is modified. To be specific, the forwarding chip finds a corresponding forwarding entry from the memory based on the forwarding entry operation information, and then modifies a value of a specified field.

The forwarding chip may implement the foregoing operations through a high-speed bus between the forwarding chip and the memory. The high-speed bus may be, for example, SerDes, and performance of the high-speed bus may reach four million/second, which is far better than that of a manner of operating the memory through a PCI-E bus by nearly 100 times.

In the present disclosure, an entry operation packet including forwarding entry operation information is received through a data channel, and the forwarding chip performs a forwarding entry-associated operation on the memory based on the entry operation packet and through the high-speed bus between the forwarding chip and the memory. In one aspect, a CPU can be separated from work of generating and delivering a forwarding entry, which not only reduces load of the CPU, but also prevents performance of the CPU from affecting processing of the forwarding entry. In another aspect, the forwarding entry is no longer processed through a bus (for example, a PCI-E bus) between the CPU and the memory but through the high-speed bus between the forwarding chip and the memory, which greatly improves efficiency of processing the forwarding entry.

In a possible implementation, before the parsing the entry operation packet to obtain forwarding entry operation information, the method further includes: performing identity authentication and/or integrity authentication on the entry operation packet, to be specific, performing the identity authentication based on a format or a length of the entry operation packet; and/or performing the integrity authentication based on a preset check field in the entry operation packet.

Optionally, the identity authentication is performed based on the format or the length of the entry operation packet. The format and the length of the entry operation packet are specially designed. Therefore, when determining that the received packet is an entry operation packet, the forwarding chip may further determine, based on a format and a length of the received packet, whether the packet meets the format and the length of the entry operation packet, to complete security authentication on the packet.

Optionally, the integrity authentication is performed based on the preset check field in the entry operation packet. A transmit end of the packet may perform AND/OR processing on several fields in the packet, and then store a processing result in a specified field. The forwarding chip may perform AND/OR processing on the several fields in a same method, and then compare a processing result with a value in the specified field. If the processing result is consistent with the value, the authentication succeeds; or if the processing result is inconsistent with the value, the authentication fails.

In a possible implementation, before the parsing the entry operation packet to obtain forwarding entry operation information, the method further includes: determining, based on a destination address in the entry operation packet, to parse the entry operation packet, where the destination address includes an Internet Protocol (IP) address or a media access control (MAC) address.

The destination address may be a destination Internet Protocol (IP) address carried in the packet, or may be a destination media access control (MAC) address carried in the packet. The destination addresses both indicate a destination of the packet. Therefore, the forwarding chip may determine, based on the destination address, whether the packet is sent to the local or whether the packet needs to be forwarded locally. If the forwarding chip determines that the packet is sent to the local or is forwarded locally, the forwarding chip performs operations in the following steps; or if the forwarding chip determines that the packet is not sent to the local or is not forwarded locally, the forwarding chip discards or forwards the packet. In this way, a quantity of packets that need to be parsed by the forwarding chip can be decreased, and packet processing efficiency can be improved.

According to a second aspect, the present disclosure provides an apparatus for processing a forwarding entry, including: a receiving module, configured to receive an entry operation packet through a first data channel, where the first data channel is all data channels or any of a plurality of preset data channels; and a processing module, configured to parse the entry operation packet to obtain forwarding entry operation information, and perform a target operation on a memory based on the forwarding entry operation information, where the target operation includes adding an entry, deleting an entry, or modifying an entry.

In a possible implementation, the entry operation packet includes a preset field, and a value of the field is a specified identifier.

In a possible implementation, the processing module is further configured to perform identity authentication and/or integrity authentication on the entry operation packet.

In a possible implementation, the processing module is specifically configured to: perform the identity authentication based on a format or a length of the entry operation packet; and/or perform the integrity authentication based on a preset check field in the entry operation packet.

In a possible implementation, the forwarding entry operation information includes an operation code, and the operation code indicates the target operation.

In a possible implementation, the processing module is specifically configured to: when a value of the operation code corresponds to the adding an entry, add the forwarding entry to the memory; when a value of the operation code corresponds to the deleting an entry, delete the forwarding entry from the memory; or when a value of the operation code corresponds to the modifying an entry, modify the forwarding entry in the memory.

In a possible implementation, the processing module is further configured to determine, based on a destination address in the entry operation packet, to parse the entry operation packet, where the destination address includes an Internet Protocol (IP) address or a media access control (MAC) address.

In a possible implementation, the processing module is specifically configured to: when determining, based on the destination address, that the entry operation packet is a packet sent to the local, determine to parse the entry operation packet.

According to a third aspect, the present disclosure provides a forwarding device, including: one or more processors; and a memory, configured to store one or more programs. When the one or more programs are executed by the one or more processors, the one or more processors are enabled to implement the method according to any one of the possible implementations of the first aspect.

According to a fourth aspect, the present disclosure provides a computer-readable storage medium, including a computer program. When the computer program is executed by a computer, the computer is enabled to perform the method according to any one of the possible implementations of the first aspect.

According to a fifth aspect, the present disclosure provides a computer program. When the computer program is executed by a computer, the computer is configured to perform the method according to any one of the possible implementations of the first aspect.

DESCRIPTION OF EMBODIMENTS

To make the objectives, technical solutions, and advantages of the present disclosure clearer, the following clearly and describes the technical solutions in the present disclosure with reference to the accompanying drawings in the present disclosure. It is clear that the described embodiments are merely some but not all embodiments of the present disclosure. All other embodiments obtained by a person of ordinary skill in the art based on embodiments of the present disclosure without creative efforts shall fall within the protection scope of the present disclosure.

In the specification, embodiments, claims, and accompanying drawings of the present disclosure, the terms such as "first" and "second" are merely intended for distinguishing between descriptions, and cannot be understood as an indication or implication of relative importance, or cannot be understood as an indication or implication of an order. In addition, the terms "include", "have", and any variant thereof are intended to cover non-exclusive inclusion, for example, include a series of steps or units. Methods, systems, products, or devices are not necessarily limited to those steps or units that are clearly listed, but may include other steps or units that are not clearly listed or that are inherent to these processes, methods, products, or devices.

It should be understood that in the present disclosure, "at least one (item)" refers to one or more, and "a plurality of" refers to two or more. "And/or" is used for describing an association relationship between associated objects, and represents that any of three relationships may exist. For example, "A and/or B" may represent one of the following three cases: Only A exists, only B exists, and both A and B exist, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one item (piece) of a, b, or c may indicate: a, b, c, "a and b", "a and c", "b and c", or "a, b, and c", where a, b, and c may be singular or plural.

Figure 1:
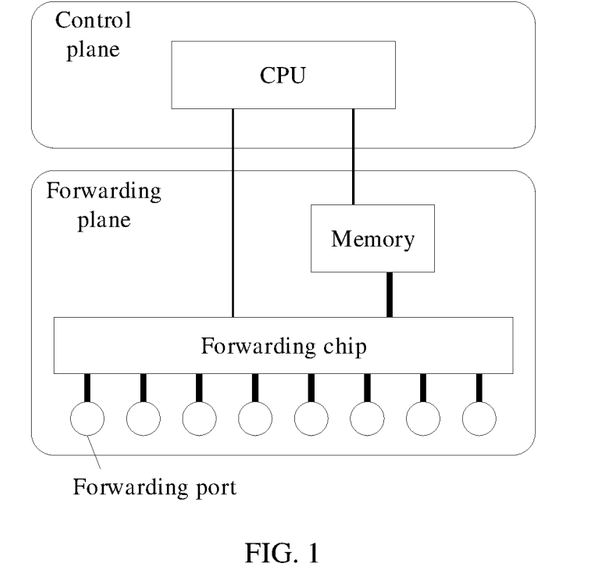
FIG. 1 is a diagram of an example structure of a forwarding device according to the present disclosure.

FIG. 1 is a diagram of an example structure of a forwarding device according to the present disclosure. As shown in FIG. 1, the forwarding device may be, for example, a cloud gateway, a router, or a hardware forwarding device having a specific function. The forwarding device includes a CPU, memory, and a forwarding chip. The forwarding chip may be, for example, a network processor (NP) chip, a field programmable gate array (FPGA) chip, or programming protocol-independent packet processors (P4). The memory may be, for example, a RAM.

The CPU usually executes control plane code of the forwarding device, and the memory and the forwarding chip jointly complete forwarding plane processing. The CPU is separately connected to the memory and the forwarding chip through a PCI-E bus (represented by a thin line). The memory and the forwarding chip are connected through a high-speed bus (for example, SerDes) (represented by a thick line). In addition, the forwarding chip is separately connected to a plurality of forwarding ports through the high-speed bus. In this way, data channels in the forwarding device are formed between the forwarding chip and the plurality of forwarding ports through the high-speed bus. It should be noted that the PCI-E bus may alternatively be replaced with another bus such as an Ethernet port. This is not specifically limited in the present disclosure.

In the present disclosure, the forwarding chip is responsible for high-speed forwarding of a data packet, and the memory is responsible for storing a forwarding entry. In addition, the forwarding chip is also responsible for identifying, authenticating, and parsing an entry operation packet, and the forwarding chip controls a memory operation based on content of the entry operation packet. For details, refer to the following description.

Figure 2:
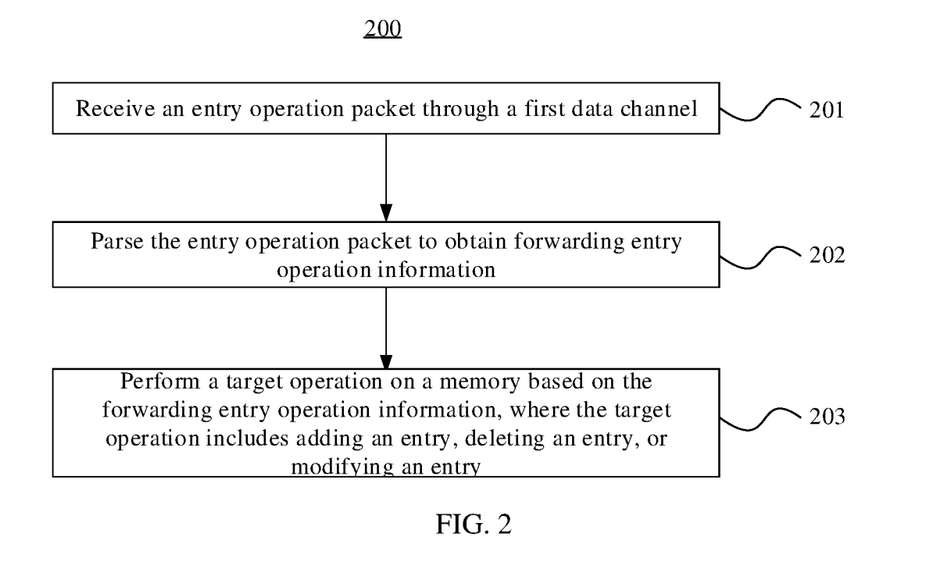
FIG. 2 is an example flowchart of a process 200 of a method for processing a forwarding entry according to the present disclosure.

FIG. 2 is an example flowchart of a process 200 of a method for processing a forwarding entry according to the present disclosure. As shown in FIG. 2, the process 200 may be performed by a forwarding device, and may be specifically performed by a forwarding chip in the forwarding device or a logic component in a forwarding chip, which may be a system on chip (SOC) of the forwarding chip in the present disclosure. The SOC may be a processor unit of the forwarding chip, or may be a logic component that has a specific calculation capability, such as a field programmable gate array (FPGA) or a single-chip microcomputer. The process 200 is described as a series of steps or operations. It should be understood that the steps or the operations of the process 200 may be performed in various sequences and/or may occur simultaneously, and are not limited to an execution sequence shown in FIG. 2. Assuming that the forwarding device is being used for a data stream having a plurality of data packets, the process 200 including the following steps is performed to process a forwarding entry, for example, add an entry, delete an entry, or modify an entry.

Step 201: Receive an entry operation packet through a first data channel.

The first data channel is all data channels or any one or more of a plurality of preset data channels. To be specific, as described in the embodiment corresponding to FIG. 1, data channels in the forwarding device are formed between the forwarding chip and a plurality of forwarding ports through a high-speed bus. Therefore, the first data channel may be any of all the data channels, and the forwarding chip may process a packet received on any of all the data channels. Alternatively, the first data channel may be any of some of all the data channels (the some data channels may be specified in advance, and in addition to receiving and sending a data packet, the some data channels may further receive and send an entry operation packet in the present disclosure). The forwarding chip may process a packet received on any of the plurality of preset data channels.

A forwarding port that is on the forwarding device and that corresponds to the first data channel receives a to-be-processed packet, and then transmits the packet to the forwarding chip through the first data channel. The forwarding chip performs processing in the following steps on the packet. In other words, any forwarding port on the forwarding device can receive a packet, and then each forwarding port transmits the packet to the forwarding chip through a corresponding data channel. In the present disclosure, the forwarding chip may perform processing in the following steps on packets from all the data channels or the preset data channels. It should be noted that a source of the packet is not specifically limited in the present disclosure. For example, the packet may be generated by a higher layer of the forwarding device, or may be generated by a third-party device.

Generally, the packet received through the data channel may be a general data packet, or may be an entry operation packet carrying forwarding entry operation information. Therefore, the forwarding chip first determines whether the received packet is an entry operation packet. If the received packet is not an entry operation packet, the forwarding chip forwards the packet as a general data packet; or if the received packet is an entry operation packet, the forwarding chip performs processing in the following steps.

Figure 3A:
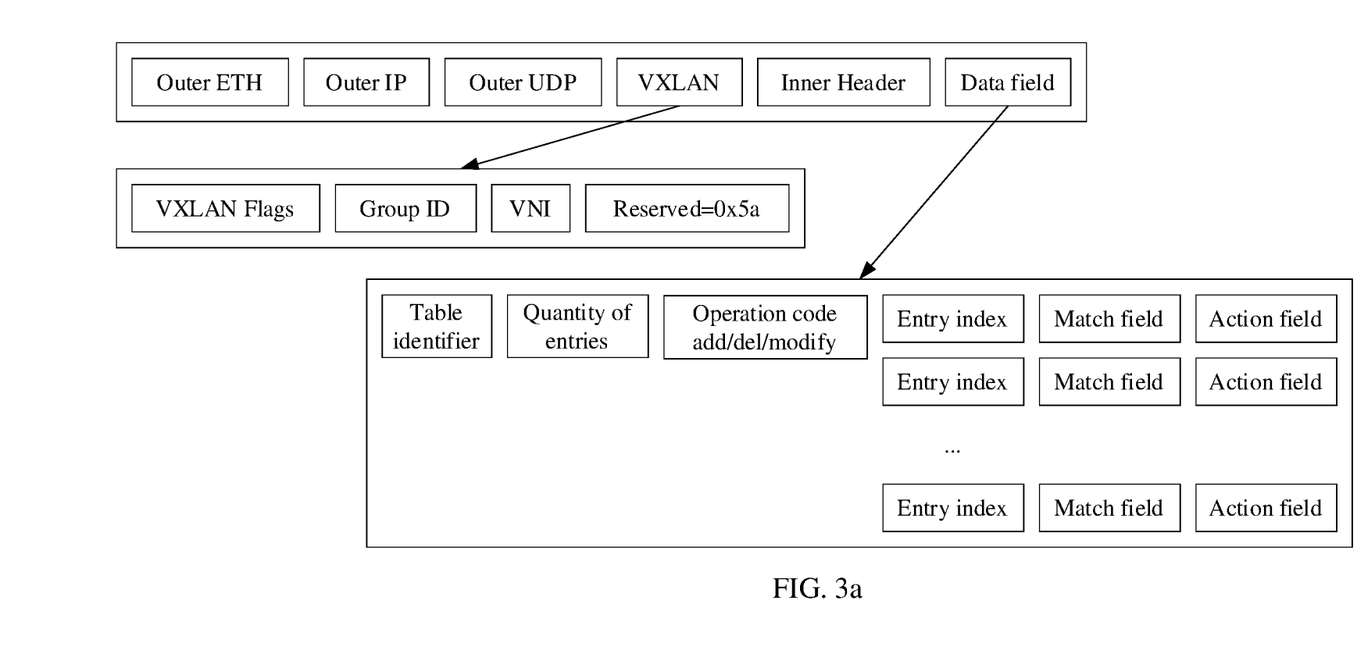
FIG. 3a is a diagram of an example format of an entry operation packet according to the present disclosure.

The forwarding chip may parse a preset field in the packet, and then determine, based on a value of the field, whether the packet is an entry operation packet. For example, FIG. 3a is a diagram of an example format of an entry operation packet according to the present disclosure. As shown in FIG. 3a, in addition to fields that comply with a protocol, such as an address field, an internal port, an external port, or a label, the entry operation packet includes a virtual extensible local area network (VXLAN) field. After receiving the packet, the forwarding chip parses the VXLAN field. If a value of the field is not a specific identifier field (for example, 0x5a), it indicates that the packet is not an entry operation packet; or if the value of the field is a specific identifier field (for example, 0x5a), it indicates that the packet is an entry operation packet.

Step 202: Parse the entry operation packet to obtain forwarding entry operation information.

In the present disclosure, an entry operation refers to an action of performing an operation on a hardware forwarding table, including addition, deletion, modification, query, or the like. The entry operation packet is a packet carrying entry operation information, which is referred to as a routing table entry. The forwarding entry operation information includes an operation code, and the operation code indicates a target operation performed on a memory. The target operation includes adding an entry, deleting an entry, or modifying an entry. For example, as shown in FIG. 3a, the entry operation packet further includes a Data field, and the field may be used to carry the forwarding entry operation information. In a possible implementation, the forwarding entry operation information may include the following content.

(1) The forwarding entry operation information includes a table identifier (which is used to identify a forwarding table), and an operation code (including adding an entry (add), deleting an entry (del), or modifying an entry (modify)). Optionally, when the entry operation packet carries content of a plurality of forwarding entries, the forwarding entry operation information may further include a quantity of entries.

(2) For each forwarding entry, the forwarding entry operation information includes an entry index (which is used to identify a forwarding entry), a match field (which may be any field to be matched, for example, may be described by using a type-length-value (type length value, TLV) triplet, or may be described by using a length, an offset, or a value of a packet), and an action field (which may be adding an entry (add), deleting an entry (del), or modifying an entry (modify)). For example, the forwarding entry operation information may be described by using "action (add/del/modify)+TLV", or may be described by using "action (add/del/modify)+length, offset, or edition value of a packet".

(3) The forwarding entry operation information includes related information such as entry aging and statistics. Optionally, the entry aging and statistics information may be added to each entry.

Step 203: Perform a target operation on a memory based on the forwarding entry operation information, where the target operation includes adding an entry, deleting an entry, or modifying an entry.

Figure 3B:
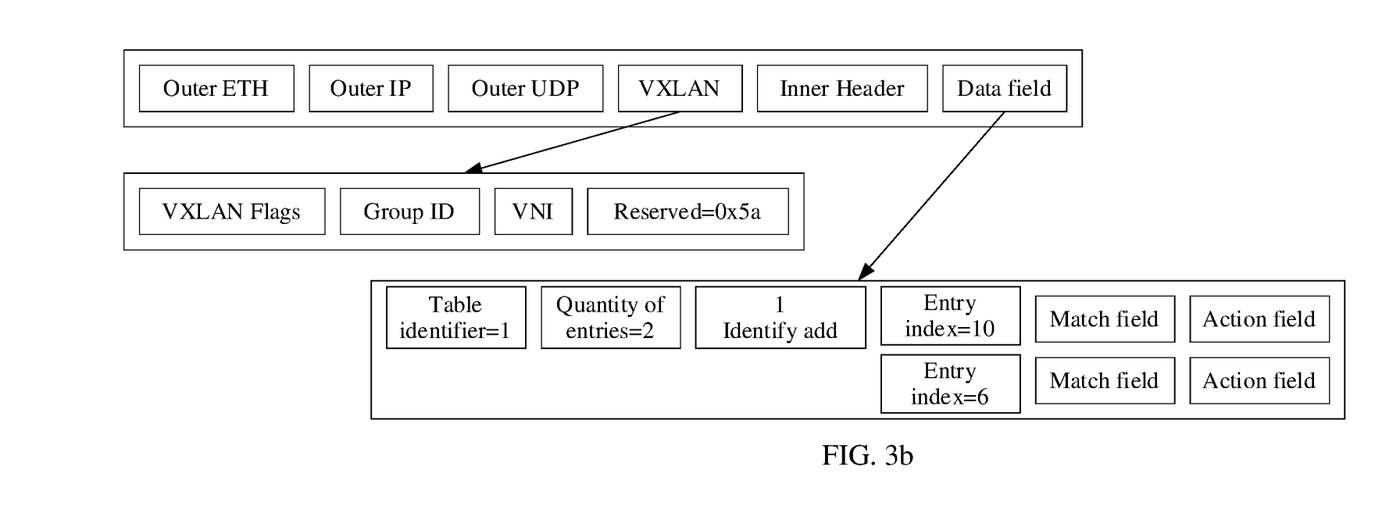
FIG. 3b is a diagram of an example format of an entry operation packet according to the present disclosure.

Optionally, when a value of the operation code corresponds to the adding an entry, a forwarding entry is added to the memory. To be specific, the forwarding chip generates a new forwarding entry based on the forwarding entry operation information, and writes the forwarding entry into the memory. For example, FIG. 3*b* is a diagram of an example format of an entry operation packet according to the present disclosure. As shown in FIG. 3*b*, the operation code in the Data field is 1, which indicates adding an entry (add). Two forwarding entries are added to the memory, and indexes of the two forwarding entries are respectively 10 and 6.

Figure 3C:
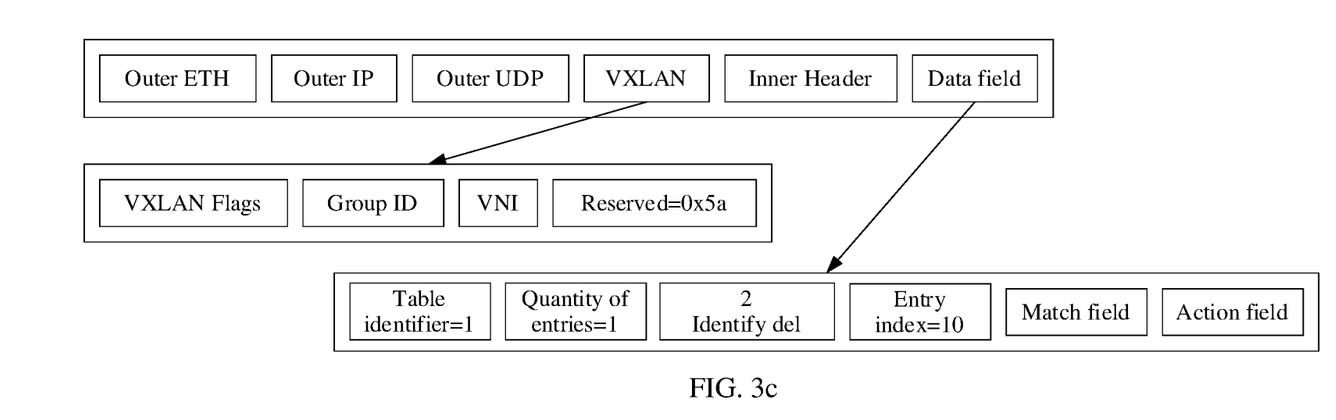
FIG. 3c is a diagram of an example format of an entry operation packet according to the present disclosure.

Optionally, when a value of the operation code corresponds to the deleting an entry, a forwarding entry is deleted from the memory. To be specific, the forwarding chip finds a corresponding forwarding entry from the memory based on the forwarding entry operation information, and deletes the forwarding entry. For example, FIG. 3*c* is a diagram of an example format of an entry operation packet according to the present disclosure. As shown in FIG. 3*c*, the operation code in the Data field is 2, which indicates deleting an entry (del). A forwarding entry whose entry index is 10 is found from the memory and deleted.

Figure 3D:
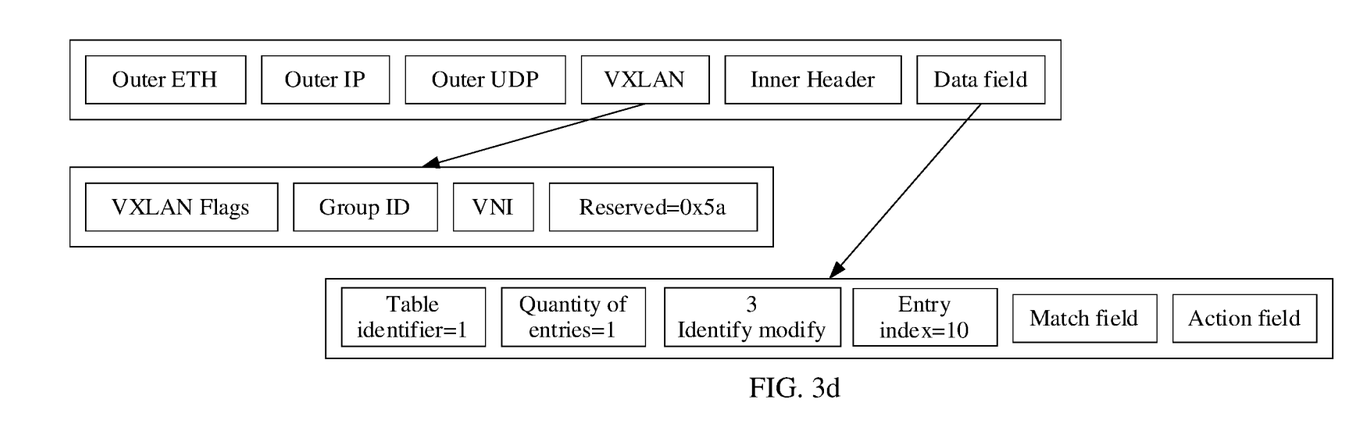
FIG. 3d is a diagram of an example format of an entry operation packet according to the present disclosure.

Optionally, when a value of the operation code corresponds to the modifying an entry, a forwarding entry in the memory is modified. To be specific, the forwarding chip finds a corresponding forwarding entry from the memory based on the forwarding entry operation information, and then modifies a value of a specified field. For example, FIG. 3*d* is a diagram of an example format of an entry operation packet according to the present disclosure. As shown in FIG. 3*d*, the operation code in the Data field is 3, which indicates modifying an entry (modify). A forwarding entry whose entry index is 10 is found from the memory, and the forwarding entry is modified based on a match field and an action field.

The forwarding chip may implement the foregoing operations through a high-speed bus between the forwarding chip and the memory. The high-speed bus may be, for example, SerDes. After being received from the data channel, the entry operation packet is directly processed on the SOC, to complete a complete entry delivery operation. A PCI-E bus no longer needs to be passed through and participation and processing of a CPU are no longer required, so that a quantity of entries installed per second can be increased by two orders of magnitude.

In the present disclosure, an entry operation packet including forwarding entry operation information is received through a data channel, and the forwarding chip performs a forwarding entry-associated operation on the memory based on the entry operation packet and through the high-speed bus between the forwarding chip and the memory. In one aspect, a CPU can be separated from work of generating and delivering a forwarding entry, which not only reduces load of the CPU, but also prevents performance of the CPU from affecting processing of the forwarding entry. In another aspect, the forwarding entry is no longer processed through a bus (for example, a PCI-E bus) between the CPU and the memory but through the high-speed bus between the forwarding chip and the memory, which greatly improves efficiency of processing the forwarding entry.

Figure 4:
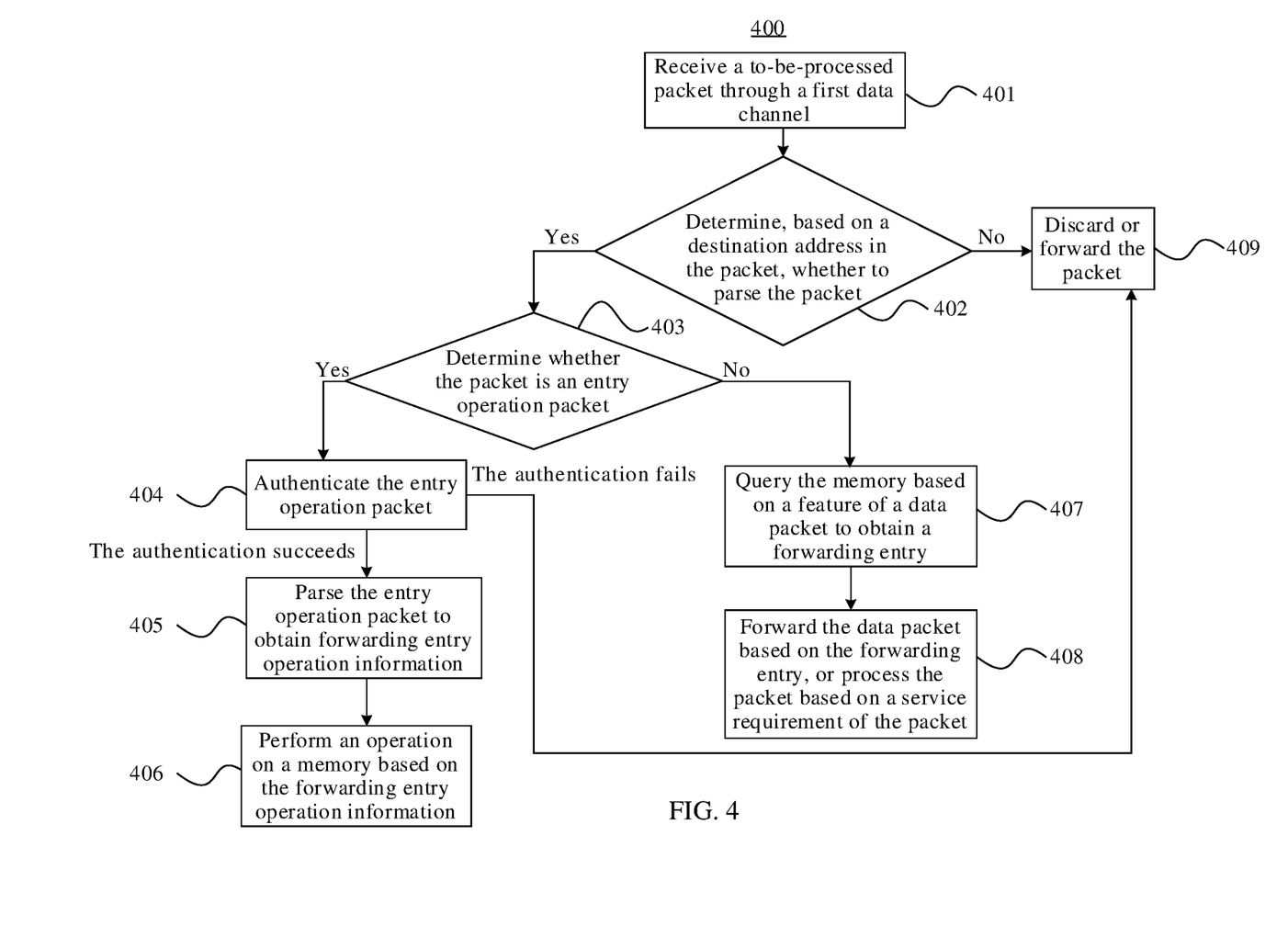
FIG. 4 is an example flowchart of a process 400 of a method for processing a forwarding entry according to the present disclosure.

FIG. 4 is an example flowchart of a process 400 of a method for processing a forwarding entry according to the present disclosure. As shown in FIG. 4, the process 400 may be performed by a forwarding device, and may be specifically performed by a forwarding chip in the forwarding device. The process 400 is described as a series of steps or operations. It should be understood that the steps or the operations of the process 400 may be performed in various sequences and/or may occur simultaneously, and are not limited to an execution sequence shown in FIG. 4. Assuming that the forwarding device is being used for a data stream having a plurality of data packets, the process 400 including the following steps is performed to process a forwarding entry, for example, add an entry, delete an entry, or modify an entry.

Step 401: Receive a to-be-processed packet through a first data channel.

For step 401, refer to step 201 in the embodiment shown in FIG. 2. Details are not described herein again.

Step 402: Determine, based on a destination address in the packet, whether to parse the packet.

The destination address may be a destination Internet Protocol (IP) address carried in the packet, or may be a destination media access control (MAC) address carried in the packet. The destination addresses both indicate a destination of the packet. Therefore, the forwarding chip may determine, based on the destination address, whether the packet is sent to the local or whether the packet needs to be forwarded locally. If the forwarding chip determines that the packet is sent to the local or is forwarded locally, the forwarding chip performs operations in the following steps; or if the forwarding chip determines that the packet is not sent to the local or is not forwarded locally, the forwarding chip discards or forwards the packet. In this way, a quantity of packets that need to be parsed by the forwarding chip can be decreased, and packet processing efficiency can be improved.

If it is determined that the packet needs to be parsed, jump to step 403; or if it is determined that the packet is not parsed, jump to step 409.

Step 403: Determine whether the packet is an entry operation packet.

For step 403, refer to step 202 in the embodiment shown in FIG. 2. Details are not described herein again.

If it is determined that the packet is an entry operation packet, jump to step 404; or if it is determined that the packet is not an entry operation packet, jump to step 407.

Step 404: Authenticate the entry operation packet.

In a possible implementation, identity authentication is performed based on a format or a length of the entry operation packet. As shown in FIG. 3a, the format and the length of the entry operation packet are specially designed. Therefore, when determining that the received packet is an entry operation packet, the forwarding chip may further determine, based on a format and a length of the received packet, whether the packet meets the format and the length of the entry operation packet, to complete security authentication on the packet.

In a possible implementation, integrity authentication is performed based on a preset check field in the entry operation packet. A transmit end of the packet may perform AND/OR processing on several fields in the packet, and then store a processing result in a specified field. The forwarding chip may perform AND/OR processing on the several fields in a same method, and then compare a processing result with a value in the specified field. If the processing result is consistent with the value, the authentication succeeds; or if the processing result is inconsistent with the value, the authentication fails.

If the entry operation packet succeeds in the authentication, jump to step 405; or if the entry operation packet fails in the authentication, jump to step 409.

Step 405: Parse the entry operation packet to obtain forwarding entry operation information.

For step 405, refer to step 203 in the embodiment shown in FIG. 2. Details are not described herein again.

Step 406: Perform an operation on a memory based on the forwarding entry operation information.

For step 405, refer to step 204 in the embodiment shown in FIG. 2. Details are not described herein again.

Step 407: Query the memory based on a feature of a data packet to obtain a forwarding entry.

The forwarding chip may query, based on any specified condition, information stored in the memory, to obtain a forwarding entry, for example, a user datagram protocol (UDP) port number, a VXLAN VNI, or other information.

Step 408: Forward the data packet based on the forwarding entry, or process the packet based on a service requirement of the packet.

Step 409: Discard or forward the packet.

In the present disclosure, an entry operation packet including forwarding entry operation information is received through a data channel, and the forwarding chip performs a forwarding entry-associated operation on the memory based on the entry operation packet and through a high-speed bus between the forwarding chip and the memory. In one aspect, a CPU can be separated from work of generating and delivering a forwarding entry, which not only reduces load of the CPU, but also prevents performance of the CPU from affecting processing of the forwarding entry. In another aspect, the forwarding entry is no longer processed through a bus (for example, a PCI-E bus) between the CPU and the memory but through the high-speed bus between the forwarding chip and the memory, which greatly improves efficiency of processing the forwarding entry.

Figure 5:
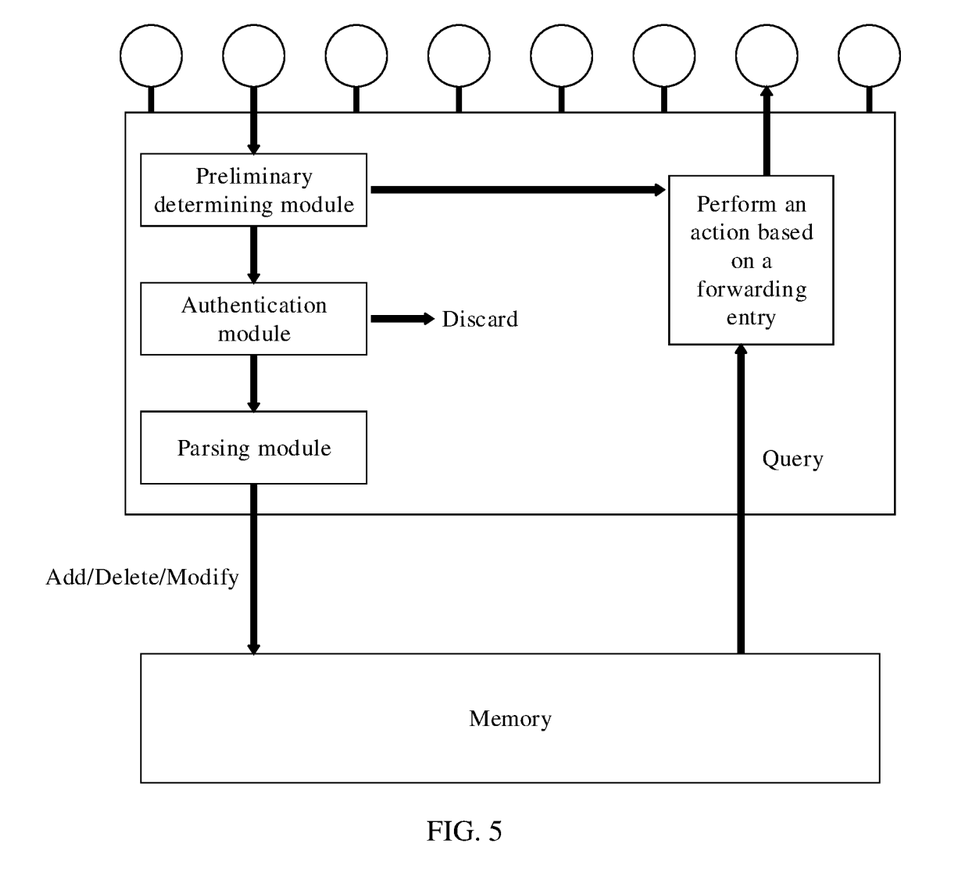
FIG. 5 is a block diagram of an example procedure in which a forwarding chip processes a packet according to the present disclosure.

FIG. 5 is a block diagram of an example procedure in which a forwarding chip processes a packet according to the present disclosure. As shown in FIG. 5, based on FIG. 1, the forwarding chip includes a preliminary determining module, an authentication module, and a parsing module. The preliminary determining module is configured to determine a packet received from any data channel, to determine whether the packet is an entry operation packet. If the packet is an entry operation packet, the packet is forwarded to the authentication module for execution; or if the packet is not an entry operation packet, the packet is forwarded, through a data channel, to a corresponding egress port based on a corresponding forwarding entry found from memory. The preliminary determining module may be run on a programmable hardware device, for example, an NP chip or an FPGA. An implementation of the preliminary determining module includes but is not limited to microcode. The authenticating module is configured to authenticate a packet determined as an entry operation packet. For an authentication method, refer to step 404 in the embodiment shown in FIG. 4. If the authentication succeeds, the packet is forwarded to the parsing module for execution; or if the authentication fails, the packet is discarded or forwarded. The parsing module is configured to parse a packet succeeding in authentication to obtain forwarding entry operation information, to obtain a forwarding entry-associated operation that is performed on the memory; and perform the operation on the memory.

Figure 6:
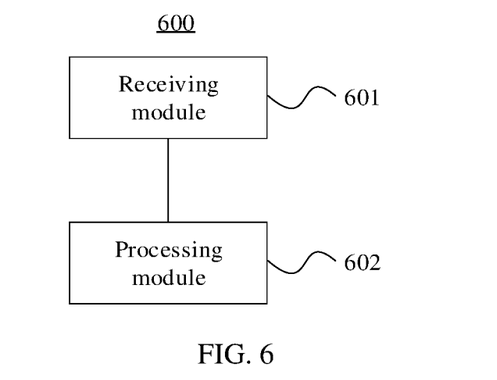
FIG. 6 is a diagram of an example structure of an apparatus for processing a forwarding entry according to the present disclosure.

FIG. 6 is a diagram of an example structure of an apparatus for processing a forwarding entry according to the present disclosure. As shown in FIG. 6, the apparatus in this embodiment may be the forwarding device shown in FIG. 1, especially the forwarding chip in the forwarding device. The apparatus includes a receiving module 601 and a processing module 602.

The receiving module 601 is configured to receive a to-be-processed entry operation packet through a first data channel, where the first data channel is all data channels or any of a plurality of preset data channels. The processing module 602 is configured to parse the entry operation packet to obtain forwarding entry operation information, and perform a target operation on a memory based on the forwarding entry operation information, where the target operation includes adding an entry, deleting an entry, or modifying an entry.

In a possible implementation, the entry operation packet includes a preset field, and a value of the field is a specified identifier.

In a possible implementation, the processing module is further configured to perform identity authentication and/or integrity authentication on the entry operation packet.

In a possible implementation, the processing module 602 is specifically configured to perform the identity authentication based on a format or a length of the entry operation packet; and/or perform the integrity authentication based on a preset check field in the entry operation packet.

In a possible implementation, the forwarding entry operation information includes an operation code, and the operation code indicates the target operation.

In a possible implementation, the processing module 602 is specifically configured to: when a value of the operation code corresponds to the adding an entry, add the forwarding entry to the memory; when a value of the operation code corresponds to the deleting an entry, delete the forwarding entry from the memory; or when a value of the operation code corresponds to the modifying an entry, modify the forwarding entry in the memory.

In a possible implementation, the processing module 602 is further configured to: determine, based on a destination address in the entry operation packet, whether to parse the entry operation packet, where the destination address includes an Internet Protocol (IP) address or a media access control (MAC) address; and when determining to parse the packet, determine whether the packet is an entry operation packet.

In a possible implementation, the processing module 602 is specifically configured to: when determining, based on the destination address, that the entry operation packet is a packet sent to the local, determine to parse the entry operation packet.

The apparatus in this embodiment may be configured to perform the technical solution in the method embodiment shown in FIG. 2. Implementation principles and technical effects of the apparatus and the method are similar, and details are not described herein again.

In an implementation process, the steps in the foregoing method embodiments can be completed by using a hardware integrated logic circuit in a processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The steps in the methods disclosed in embodiments of the present disclosure may be directly performed and completed by using a hardware encoding processor, or may be performed and completed by using a combination of hardware in the encoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory in each of the foregoing embodiments may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. As an example description rather than a limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the systems and methods described in this specification are intended to include but not limit to these memories and any memory of another proper type.

A person of ordinary skill in the art may be aware that, the units and the algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A skilled person may use different methods for particular applications to implement the described functions, but this implementation should not be considered as beyond the scope of the present disclosure.

It may be clearly understood by a person skilled in the art that, for convenient and brief description, for specific working processes of the system, apparatus, and unit described above, refer to corresponding processes in the foregoing method embodiments. Details are not described herein again.

In the several embodiments provided in the present disclosure, it should be understood that the disclosed system, apparatus, and method may be implemented in other manners. For example, the apparatus embodiment described above is merely an example. For example, division of the units is merely logical function division, and there may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may or may not be physical units, that is, may be located in one place, or may be distributed on a plurality of network units. Some or all of the units may be selected based on an actual requirement to achieve the objectives of the solutions in embodiments.

In addition, functional units in embodiments of the present disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in the present disclosure essentially, or the part contributing to the conventional technology, or a part of the technical solutions may be implemented in a form of a software product. The computer software product is stored in a storage medium and includes several instructions for instructing a computer device (a personal computer, a server, a network device, or the like) to perform all or some of the steps in the methods in embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for processing a forwarding entry, comprising:
   receiving, via a forwarding chip, an entry operation packet through one or more data channels,
   wherein the one or more data channels is/are all data channels or one or more of a plurality of preset data channels in a data forwarding device;
   parsing, via the forwarding chip, the entry operation packet to obtain forwarding entry operation information; and
   performing, via the forwarding chip, a target operation on a memory based on the forwarding entry operation information directly through a high-speed bus between the forwarding chip and the memory, wherein the target operation comprises adding an entry into the memory, deleting an entry from the memory, or modifying an entry in the memory,
   wherein the forwarding chip is different from a central processing unit (CPU), in the data forwarding device, that is separately connected to the memory and the forwarding chip through at least one a bus.

2. The method according to claim 1, wherein the entry operation packet comprises a preset field, and a value of the preset field is a specified identifier.

3. The method according to claim 1, further comprising: before the parsing the entry operation packet to obtain forwarding entry operation information, performing identity authentication and/or integrity authentication on the entry operation packet.

4. The method according to claim 3, wherein the performing identity authentication and/or integrity authentication on the entry operation packet comprises: performing the identity authentication based on a format or a length of the entry operation packet; and/or performing the integrity authentication based on a preset check field in the entry operation packet.

5. The method according to claim 1, wherein the forwarding entry operation information comprises an operation code indicating the target operation.

6. The method according to claim 5, wherein the performing a target operation on a memory based on the forwarding entry operation information comprises: when a value of the operation code corresponds the adding an entry, adding the forwarding entry to the memory; when a value of the operation code corresponds to the deleting an entry, deleting the forwarding entry from the memory; or when a value of the operation code corresponds to the modifying an entry, modifying the forwarding entry in the memory.

7. The method according to claim 1, further comprising: before the parsing the entry operation packet to obtain forwarding entry operation information, determining, based on a destination address in the entry operation packet, to parse the entry operation packet, wherein the destination address comprises an Internet Protocol (IP) address or a media access control (MAC) address.

8. The method according to claim 7, wherein the determining, based on a destination address in the entry operation packet, to parse the packet comprises: when determining, based on the destination address, that the entry operation packet is a packet sent to local, determining to parse the entry operation packet.

9. The method according to claim 1, wherein the high-speed bus between the forwarding chip and the memory is SerDes.

10. A forwarding device, comprising a forwarding chip that includes:
    one or more processors; and
    at least one memory, configured to store one or more programs including instructions that, when executed by the, cause forwarding chip to perform operations comprising:
    receiving an entry operation packet through one or more data channels, wherein the one or more data channels is/are all data channels or one or more of a plurality of preset data channels in the forwarding device;
    parsing the entry operation packet to obtain forwarding entry operation information;

performing a target operation on a memory in the at least one memory based on the forwarding entry operation information directly through a high-speed bus between the forwarding chip and the memory, wherein the target operation comprises adding an entry into the memory, deleting an entry from the memory, or modifying an entry in the memory, and wherein the forwarding chip is different from a central processing unit (CPU), in the forwarding device, that is separately connected to the memory and the forwarding chip through at least one a bus.

11. The forwarding device according to claim 10, wherein the entry operation packet comprises a preset field, and a value of the preset field is a specified identifier.

12. The forwarding device according to claim 10, wherein the operations further comprise: before the parsing the entry operation packet to obtain forwarding entry operation information, performing identity authentication and/or integrity authentication on the entry operation packet.

13. The forwarding device according to claim 12, wherein the performing identity authentication and/or integrity authentication on the entry operation packet comprises: performing the identity authentication based on a format or a length of the entry operation packet; and/or performing the integrity authentication based on a preset check field in the entry operation packet.

14. The forwarding device according to claim 10, wherein the forwarding entry operation information comprises an operation code indicating the target operation.

15. The forwarding device according to claim 14, wherein the performing a target operation on a memory based on the forwarding entry operation information comprises: when a value of the operation code corresponds the adding an entry, adding the forwarding entry to the memory; when a value of the operation code corresponds to the deleting an entry, deleting the forwarding entry from the memory; or when a value of the operation code corresponds to the modifying an entry, modifying the forwarding entry in the memory.

16. The forwarding device according to claim 10, further comprising: before the parsing the entry operation packet to obtain forwarding entry operation information, determining, based on a destination address in the entry operation packet, to parse the entry operation packet, wherein the destination address comprises an Internet Protocol (IP) address or a media access control (MAC) address.

17. The forwarding device according to claim 16, wherein the determining, based on a destination address in the entry operation packet, to parse the packet comprises: when determining, based on the destination address, that the entry operation packet is a packet sent to local, determining to parse the entry operation packet.

18. A non-transitory computer-readable storage medium, comprising a computer program, including instructions that, when executed by a forwarding chip in a data forwarding device, enable data forwarding chip to perform operations comprising:

receiving an entry operation packet through one or more data channels, wherein the one or more data channels is/are all data channels or one or more of a plurality of preset data channels in the data forwarding device;

parsing the entry operation packet to obtain forwarding entry operation information;

performing a target operation on a memory based on the forwarding entry operation information directly through a high-speed bus between the forwarding chip and the memory, wherein the target operation comprises adding an entry into the memory, deleting an entry from the memory, or modifying an entry in the memory, and wherein the forwarding chip is different from a central processing unit (CPU), in the forwarding device, that is separately connected to the memory and the forwarding chip through at least one a bus.

19. The non-transitory computer-readable storage medium according to claim 18, wherein the entry operation packet comprises a preset field, and a value of the preset field is a specified identifier.

* * * * *

UNITED STATES PATENT AND TRADEMARK OFFICE
CERTIFICATE OF CORRECTION

PATENT NO. : 12,463,901 B2
APPLICATION NO. : 18/316383
DATED : November 4, 2025
INVENTOR(S) : Haiyan Chen et al.

Page 1 of 1

It is certified that error appears in the above-identified patent and that said Letters Patent is hereby corrected as shown below:

In the Claims

Column 14, Claim 10, Lines 59-61, change "when executed by the, cause forwarding chip to perform operations comprising;" to --when executed by the one or more processors, cause the forwarding chip to perform operations comprising; and--;

Column 14, Claim 10, Lines 66 and 67, change "parsing the entry operation packet to obtain forwarding entry operation information;" to --parsing the entry operation packet to obtain forwarding entry operation information; and--;

Column 15, Claim 10, Lines 5-7, change "memory, deleting an entry from the memory, or modifying an entry in the memory, and;" to --memory, deleting an entry from the memory, or modifying an entry in the memory,--; and Column 16, Claim 18, Lines 22 and 23 change, "parsing the entry operation packet to obtain forwarding entry operation information;" to --parsing the entry operation packet to obtain forwarding entry operation information; and--.

Signed and Sealed this
Ninth Day of December, 2025

John A. Squires
*Director of the United States Patent and Trademark Office*